April 4, 1950 B. W. LANCE Re. 23,216

MICROMETER LAP AND GUIDE

Original Filed May 29, 1946 2 Sheets-Sheet 1

INVENTOR.

BEN W. LANCE,

BY Victor J. Evans & Co.

ATTORNEYS

MICROMETER LAP AND GUIDE

Original Filed May 29, 1946 2 Sheets-Sheet 2

INVENTOR.

BEN W. LANCE,

BY Victor J. Evans & Co.

ATTORNEYS

Reissued Apr. 4, 1950

Re. 23,216

UNITED STATES PATENT OFFICE 23,216

MICROMETER LAP AND GUIDE

Ben W. Lance, Geneva, Ill.

Original No. 2,418,413, dated April 1, 1947, Serial No. 673,044, May 29, 1946. Application for reissue March 26, 1948, Serial No. 17,161

4 Claims. (Cl. 51—241)

Matter enclosed in heavy brackets [ ] appears in the original patent but forms no part of this reissue specification; matter printed in italics indicates the additions made by reissue This invention relates to a micrometer lap and guide for lapping worn spindle and anvil ends, and turning one with the other.

An object of this invention is to provide a device that will lap micrometers of various sizes in an efficient manner.

Another object of the invention is to provide a device that is simple in operation and construction, durable in use and can be inexpensively manufactured.

With the above and other objects and advantages in view, the invention consists of the novel details of construction, arrangement and combination of parts more fully hereinafter described, claimed and illustrated in the accompanying drawings in which:

Figure 1:
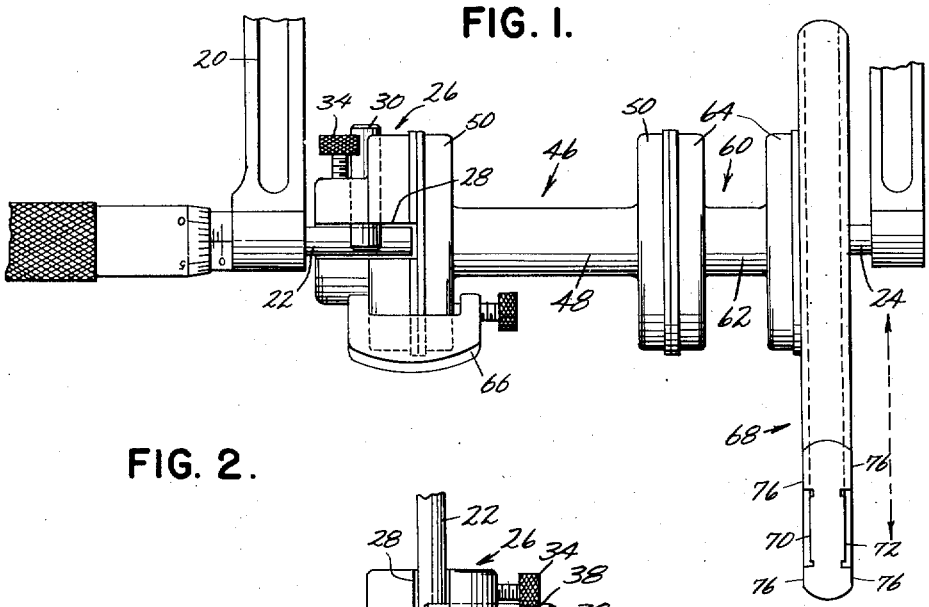
Figure 1 is an elevational view of an embodiment of the invention in the process of lapping the anvil of a micrometer.

Referring more in detail to the drawings, the reference numeral 20 designates a conventional micrometer which includes the spindle 22 and anvil 24.

Mounted on the spindle 22 is the spindle flange guide 26 which is [accomplished by means of the] *formed with a body member with a cylindrical element and a hub with a radially disposed* elongated slot 28 *extended longitudinally through the cylindrical element and hub* and the locking pin 30 having the tapered end *or tongue* 32 is mounted transversely of the slot 18 and is adjusted by means of the Allen screw 34 mounted in the flange guide 26 rotating in the seat 38 in the pin 30. The slot 28 has an inwardly tapered end 40 which coacts with the tapered end 32 of the pin 30 to firmly fix the spindle in position. The guide has a polished face 42 which is adapted to engage one of the polished faces 44 of the elongated flange guide 46 which comprises the rodlike body 48, having the circular flanges 50 at each end thereof, and the faces 44 have central threaded bores 52 to receive the Allen screws 54 whereby the face 44 of the guide 46 is engaged with and secured to by means of the threaded bores 56 in which the screws 54 are received, the polished faces 58 of the short flange guide 60. Guide 60 is similar to guide 46 except that the rodlike body 62 is foreshortened; otherwise the circular flanges 64 are of the same conformation as the flanges 50.

In use as shown in Figure 1, the guide 26 is secured to the spindle 22 and the guide 46 is secured thereto by the flange clamps 66, there being one on each side of the flanges, then the guide 60 is secured to the guide 46 by the screws 54. The spindle is then rotated until the lap 68 is in position to lap the anvil 24. The lap 68 is recessed at 70 to receive the rough abrasive and recessed at 72 to receive the smooth abrasive and the surfaces 76 are used to apply oil to the anvil.

Figure 2:
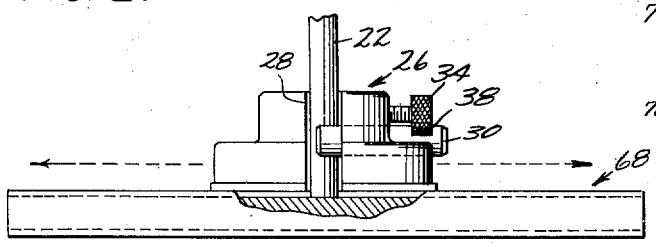
Figure 2 is an elevational view of the invention in the process of lapping the spindle.
Figure 4:
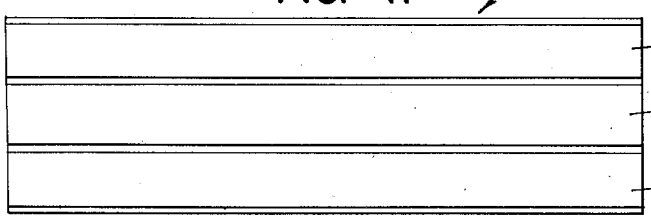
Figure 4 is an elevational view of the lap for spindle and anvil.
Figure 5:
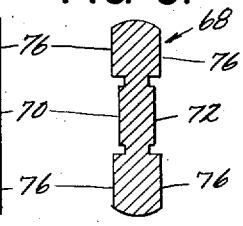
Figure 5 is an end view thereof.
Figure 6:
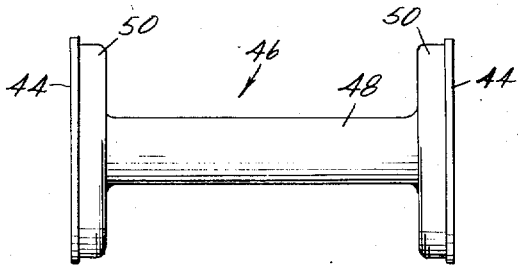
Figure 6 is an elevational view of an elongated double flange spindle.
Figure 3:
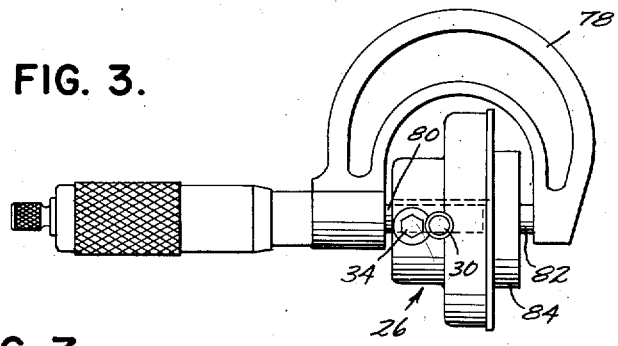
Figure 3 is a modified form of the invention.
Figure 7:
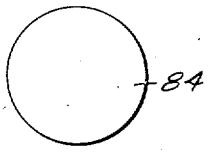
Figure 7 is an elevational view of the lap for the modification shown in Figure 3.
Figure 14:
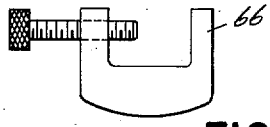
Figure 14 is an elevational view of a flange clamp.
Figure 8:
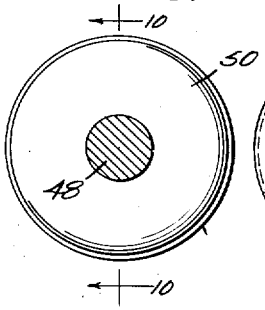
Figure 8 is a sectional view of the spindle.
Figure 9:
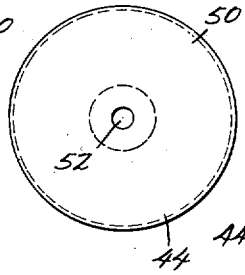
Figure 9 is an end view thereof.
Figure 10:
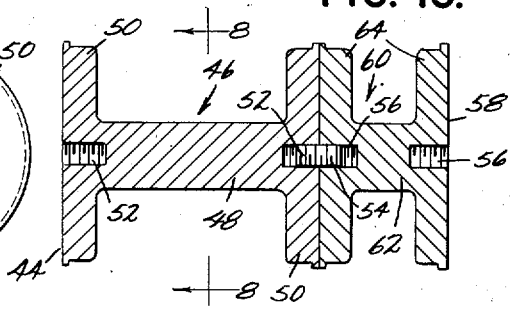
Figure 10 is a sectional view of an elongated spindle connected to a short spindle.
Figure 11:
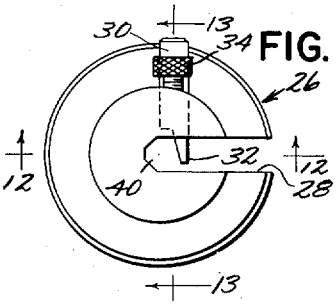
Figure 11 is a plan view of the spindle flange guide.
Figure 12:
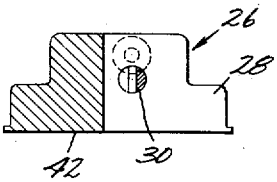
Figure 12 is a sectional view on the line 12—12 of Figure 11.
Figure 13:
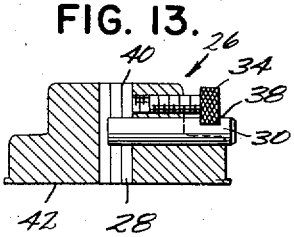
Figure 13 is a sectional view on the line 13—13 of Figure 11.

In Figure 2 the spindle 22 has been removed for lapping by the lap 68, and in Figure 3 the small micrometer 78 has the guide 26 attached to the spindle 80 and the anvil 82 is lapped by the circular lap 84.

Adjustment of the spindle will determine the clearance between the lap and anvil for the use of rough or fine abrasive, and the polished faces will provide true faces for the spindle and anvil.

It is believed that from the foregoing description, the operation and construction of the invention will be apparent to those skilled in the art, and it is to be understood that changes in the details of construction, arrangement and combination of parts may be resorted to, provided they fall within the spirit of the invention, and the scope of the appended claims.

Having thus described the invention, what is claimed as new and described to be secured by Letters Patent is:

[1. A set of the character described for lapping the spindle and anvil of a micrometer comprising flange guide means, an elongated slot in said means for securing said means to the spindle of the micrometer, means mounted transversely of said slot for retaining said spindle therein, and means connected to said guide means for supporting in close proximity to the anvil of the micrometer a lapping tool.]

[2. The invention as in claim 1 wherein the means connected to said guide means comprises a second guide means, having a rodlike body and circular flanges having polished faces on the opposite ends thereof.]

[3. The invention as in claim 1 wherein said lapping tool is recessed for the reception of abrasives, and provided with smooth surfaces on the opposite sides of the recesses for the reception of oil to be used in conjunction with said abrasive.]

*4. A set of the character described for lapping the spindle and anvil of a micrometer comprising flanged guide means, an elongated slot in said means for securing said means to the spindle of the micrometer, means mounted transversely of said slot for retaining said spindle therein, a second guide means, having a rod like body and circular flanges having polished faces on the opposite ends thereof, and means connected to said second guide means for supporting in close proximity to the anvil of the micrometer a lapping tool.*

*5. A set of the character described for lapping the spindle and anvil of a micrometer comprising flanged guide means, an elongated slot in said means for securing said means to the spindle of the micrometer, means mounted transversely of said slot for retaining said spindle therein, means connected to said guide means for supporting in close proximity to the anvil of the micrometer a lapping tool, said lapping tool being recessed for the reception of abrasives, and provided with smooth surfaces on the opposite sides of the recesses for the reception of oil to be used in conjunction with said abrasive.*

*6. A lapping tool for a micrometer having a handle with a "U"-shaped arm and having a spindle in the handle and an anvil in the outer end of the arm with the anvil aligned with the spindle, said tool comprising a hub with a centrally disposed spindle receiving bore and having an extended circular flange on the outer end, means in the hub securing the tool on the spindle with the outer face of the flange perpendicular to the axis of the spindle, a lapping sleeve having extended circular flanges at the ends, with the faces of the flanges perpendicular to the axis of the sleeve, a clamp for securing the spacing sleeve to the extended circular flange having the hub with the centrally disposed spindle receiving bore and with the axis of the sleeve aligned with the axis of the hub, spindle, and anvil, and a lapping element having parallel faces slidably actuated between the outer face of the flange of the spacing sleeve and face of the anvil.*

*7. In a micrometer lap guide, the combination which comprises a body member including a cylindrical element having a lap engaging face and a hub extended from the side thereof opposite to the side providing the lap engaging face, said body member having a longitudinally disposed radially positioned micrometer spindle receiving slot extended inwardly from one side through the center thereof and extended through the cylindrical element and hub and said opening having angularly disposed flat spindle engaging surfaces in the inner ends, said body member also having a radially disposed pin receiving opening extended perpendicularly to the said slot and positioned with part of said opening in the said cylindrical element and the remainder thereof in the hub, a pin positioned in the pin receiving opening and having a spindle engaging tongue extended from the inner end and on one side thereof, said pin also having a notch in one side and spaced from the outer end, and an adjusting screw threaded in an opening in the hub parallel to the said pin receiving opening and having a head with one side of the head extended into the slot in the pin for adjusting the position of the pin whereby the pin coacts with the said angularly disposed flat surfaces in the inner end of the spindle receiving opening of the body member to clamp the lap guide on a spindle of a micrometer with the lap engaging space thereof perpendicular to the axis of the spindle.*

BEN W. LANCE.

REFERENCES CITED

The following references are of record in the file of this patent:

UNITED STATES PATENTS

| Number | Name | Date |
|---|---|---|
| 975,329 | Collins | Nov. 8, 1910 |
| 1,221,556 | McEachron | Apr. 3, 1917 |
| 1,239,494 | Lange | Sept. 11, 1917 |
| 1,951,201 | Oakley | Mar. 13, 1934 |
| 2,151,528 | Preston | Mar. 21, 1939 |
| 2,431,598 | Wilcox et al. | Nov. 25, 1947 |

OTHER REFERENCES

"Machinery," October 1923, page 146, published by the Industrial Press, 148 Lafayette St., New York 13, New York.

"Machinery," June 1924, page 802, published by the Industrial Press, 148 Lafayette St., New York 13, New York.